United States Patent [19]

Norman

[11] 4,236,194
[45] Nov. 25, 1980

[54] LIGHT APPARATUS FOR A PIVOTAL BOOM

[76] Inventor: Raymond M. Norman, P.O. Box 92, Floodwood, Minn. 55736

[21] Appl. No.: 84,414

[22] Filed: Oct. 12, 1979

[51] Int. Cl.³ .................. F21V 33/00; B60Q 1/12; B60Q 3/00
[52] U.S. Cl. .................. 362/370; 362/89; 362/384
[58] Field of Search ........... 362/370, 382, 369, 384, 362/390, 89

[56] References Cited

U.S. PATENT DOCUMENTS

| 1,593,075 | 7/1926 | Hensley | 362/384 |
| 3,307,208 | 3/1967 | Jacobson | 362/382 X |
| 4,091,442 | 5/1978 | Markey | 362/369 X |

Primary Examiner—Donald A. Griffin
Attorney, Agent, or Firm—Wicks & Nemer

[57] ABSTRACT

A dampened light apparatus for a pivotal boom on a back hoe or the like including a support for securement to a boom. A well housing is mounted on the support, and a crank arm is pivotally mounted on the support. An electric light is mounted on the crank arm together with an electric current conducting means carried by the light, the arm and the support. A dampening blade is connected to and extending radially from the arm and extending into a liquid in the well housing for movement therein so that when pivotal movement of the boom causes relative pivotal movement between the support and the arm the blade moving through the liquid dampens the pivotal movement of the arm and the light thereon.

5 Claims, 5 Drawing Figures

LIGHT APPARATUS FOR A PIVOTAL BOOM

SUMMARY

The invention relates to lights carried by vehicles and more particularly to a light carried by the boom of a back hoe or the like. In using a back hoe, for example, at night a light is needed to show the operator the ground or material worked upon. A light mounted on the boom of a back hoe either pivoted or not is subject to the erratic movements of the boom with resulting poor light coverage of the ground worked upon. It is therefore an object of the invention to provide a light for mounting on a boom the movement of which is dampened thereby minimizing the movement of the light resulting from the movement of the boom on which the light is mounted.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
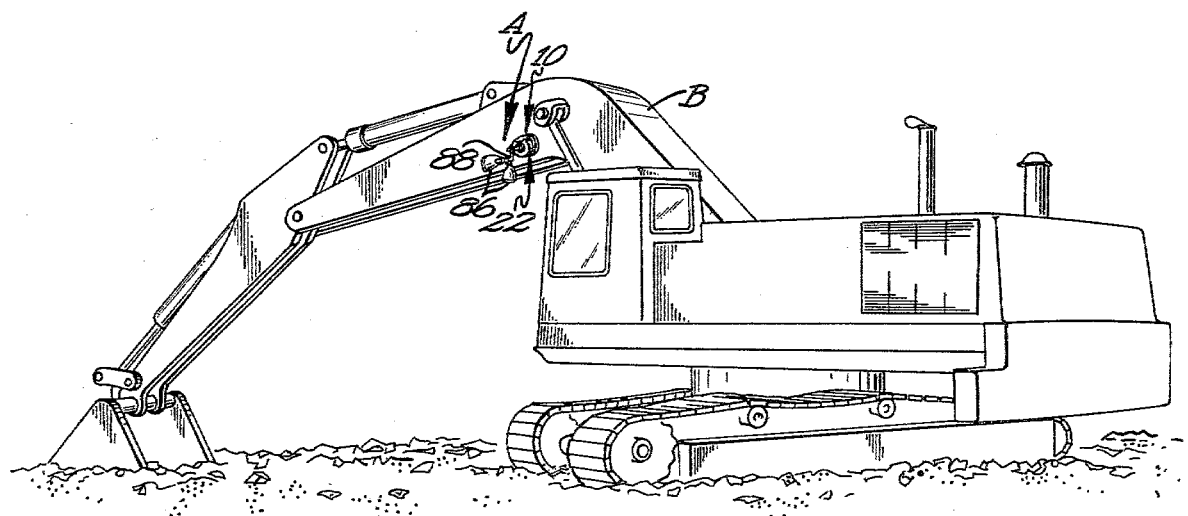
FIG. 1 is a perspective view of a back hoe machine on which a boom light embodying the invention is mounted.
Figure 4:
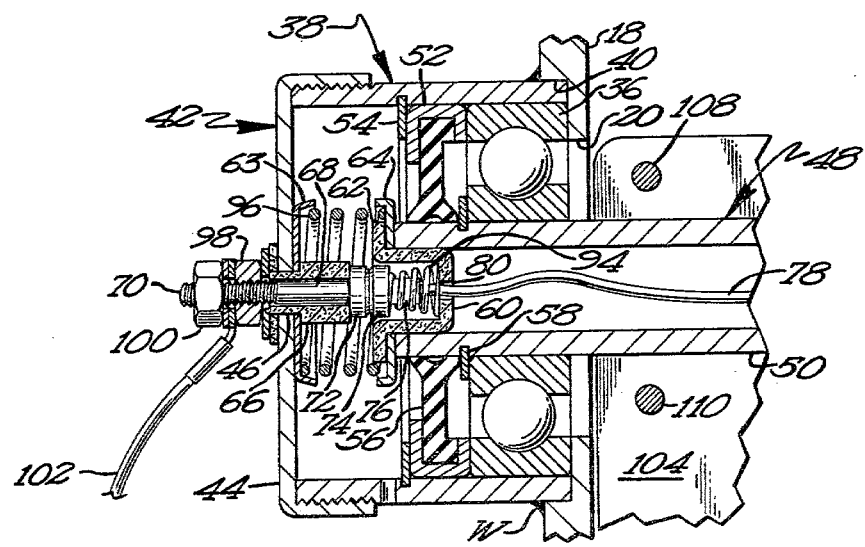
FIG. 4 is an enlarged sectional view of the electrical contact mechanism, a bearing mount for the light arm and the housing therefor.
Figure 5:
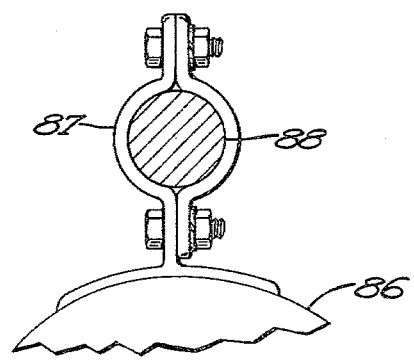
FIG. 5 is a view on the line 5—5 of FIG. 2.
Figure 2:
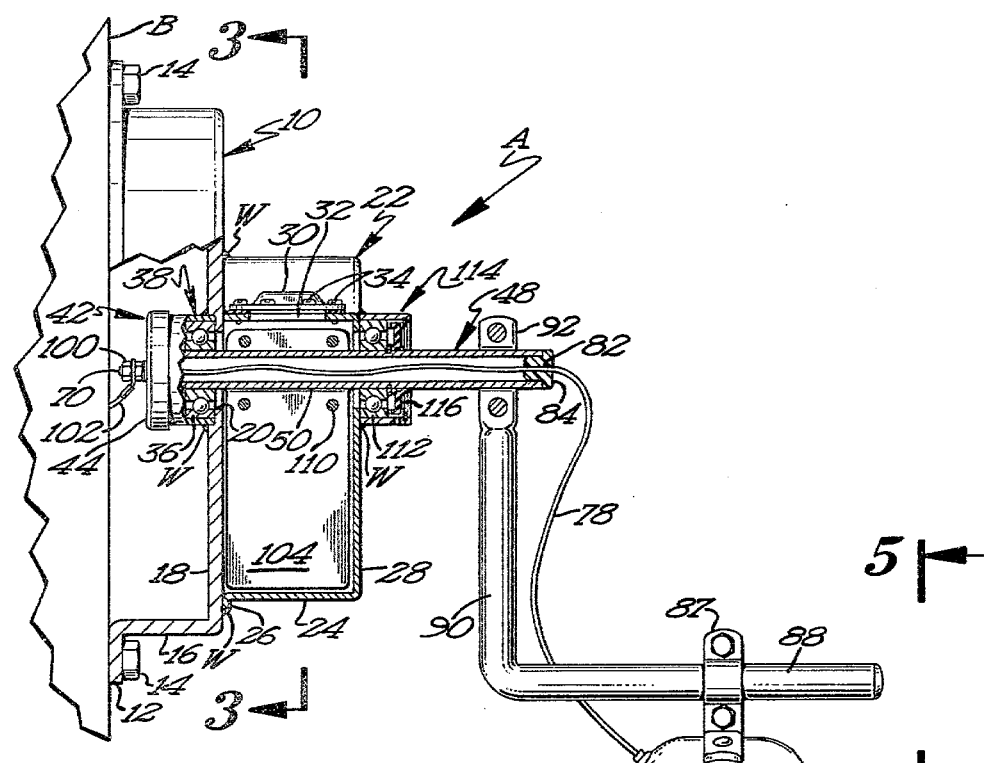
FIG. 2 is a side elevational view of the boom light portions of which are in section.
Figure 3:
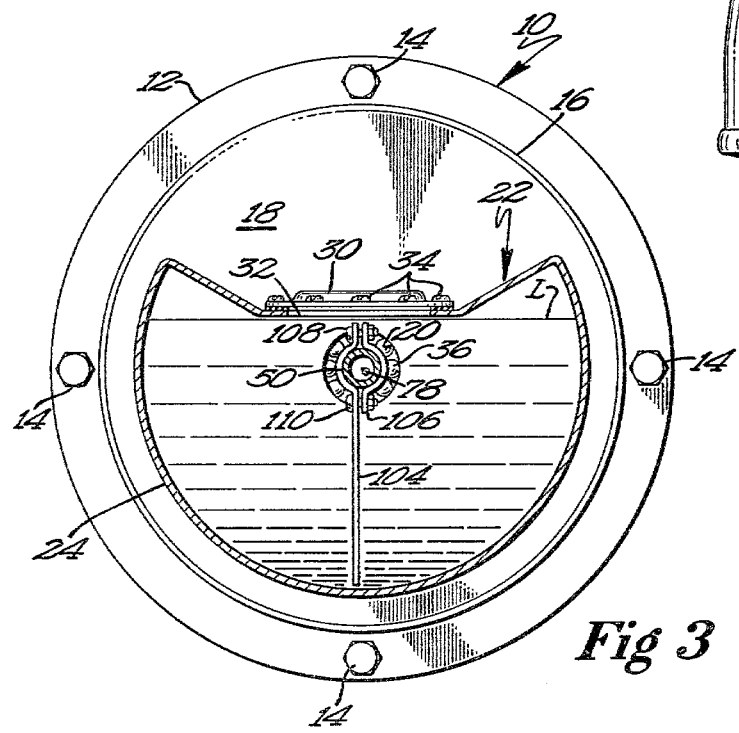
FIG. 3 is a sectional view on the line 3—3 of FIG. 2.

Referring to the drawings in detail, the dampened boom light A includes the support housing 10 having the flange 12 which is secured to the boom B by means of the bolts 14. The housing 10 also includes the circular wall 16 secured to the flange 12, and the wall 16 terminates at its outer edge in the circular flat wall 18 which has the opening 20 formed therethrough.

The numeral 22 designates a well housing including the semicircular wall 24 terminating at its inner edge in the welded connection 26 and at its outer edge in the semicircular flat wall 28. The top wall portion of the well housing 22 is formed with the access plate 30 covering the opening 32 secured by the bolts 34. The well housing 22 has liquid L therein.

Further provided is the bearing 36 mounted in the cylindrical cover 38 with the inner cover edge mounted in the recess 40 formed in the wall 18 and welded as at W. Mounted on the cover 38 is the screw cap 42 the front wall 44 of which includes the central opening 46. The numeral 48 designates a crank arm including the first hollow tubular arm portion 50 pivotally mounted at the outer end portion thereof in the bearing 36. The numeral 52 designates an annular channel retainer which abuts the outer edge of the bearing 36 and is positioned within the cover. A lock ring 54 is mounted within the cover 38 and abutting the retainer 52 to thereby position the retainer against the bearing 36.

Positioned within the retainer 52 is the ring oil seal 56 the inner surface of which has sealing engagement with the crank arm portion 50. A lock ring 58 maintains the bearing 36 in abutment against the wall 18. Additionally provided is the insulative cup retainer 60 having the outer flange 62 with the cup retainer extending into the open end of the crank arm portion 50. A first shallow cup-shaped spacer 64 is positioned between the end of the arm portion 50 and the flange 62 of the cup retainer 60, and a second shallow cup-shaped spacer 63 is positioned upon the insulative tubular support 66 within hole 46 of cap 42, and mounted within the support 66 is the rod 68 threaded as at 70 at the outer end. Secured to the inner end of the rod 68 is the first and fixed electrical contact 72.

A second and mating contact 74 is connected to the end of the support 76 coaxial with rod 68 and to which is connected the wire 78. The wire extends through the hole 80 formed in the end wall of the cup retainer 60, outwardly through the crank arm portion 50 and the hole 82 formed in the plug 84 at the outer end of the arm portion 50. The end of the wire is conventionally wired to the light globe 86 secured by means of the clamp 87 to the arm portion 88 of the extension are 90 connected at its upper end to the outer end of the crank arm portion 50 by means of a conventional clamp 92. The arm portions 50, 90 and 88 form the crank arm 48.

The contact 74 is urged against contact 72 by means of the coil spring 94 on the support 76 and abutting the contact 74 and the end wall of the cup retainer 60.

The numeral 96 designates a coil spring positioned coaxially of the support 66 and contact 72 and in abutment with the spacer 63 and spacer 64. The spring 96 maintains a ground from the boom B to the crank arm 48. Connected to the threaded end 70 of the rod 68 by means of the nuts 98 and 100 is the end of the wire 102 which is connected to a source of electrical power, not shown.

Further provided is the dampening blade 104 the upper end of which is secured to the arm portion 50 and depending into liquid L in the well housing 22. The blade 104 is secured by means of the clamp 106 secured to the upper end of the blade by means of the nut-equipped bolts 108 and 110.

The arm portion 50 is further journaled in the bearing 112 mounted in the cap 114 secured to the outer surface of the wall 28 of the housing 22 with the arm portion 50 extending through the ring oil seal 116 mounted within the cap 114. The outer end of the arm portion 50 extends outwardly of the cap 114.

As the boom B is moved up and down the light A pivots within the bearings 36 and 112 and tends to hang straight down to light up the area beneath the boom B whereby the operator can easily see the ground being worked upon. With a relatively sudden movement of the boom the light moves relatively slowly due to the restrictive movement of the dampening blade through the liquid with the light returning to the position of hanging straight down if so mounted on arm portion 88.

Additionally, the position of the light A relative to the boom B in a static position may be changed to cover a different area of ground below the boom by clamping the light at a different angle on the arm portion 88 by means of clamp 87.

Further two lights may be mounted on the arm portion 88 for covering additional or different areas on the ground as illustrated in FIG. 1.

Having thus described the invention, what is claimed as new and desired to be secured by Letters Patent is:

1. A dampened light apparatus for a pivotal boom comprising:
   (a) support means,
   (b) means for connecting said support means to a boom, (c) a well housing carried by said support means and having,
(d) a liquid contained therein
(e) an arm,
(f) means pivotally mounting said arm on said support means and said well housing,
(g) an electric light mounted on said arm,
(h) electric current conducting means carried by said light, said arm and said support means for connection with a source of electrical power for the actuation of said light,
(i) a dampening blade connected to and extending radially from said arm and extending into said liquid for movement therein so that when there is relative pivotal movement between said support means and said arm said blade moving through said liquid dampens the pivotal movement of said arm and the light thereon.

2. The device of claim 1 in which
(a) said support means includes a housing.
3. The device of claim 2 in which
(a) said arm includes a first portion having
(b) a second portion extending at a right angle thereto and terminating in
(c) a third portion at a right angle to said second portion and parallel to said first portion.
4. The device of claim 1 in which
(a) said arm includes a first portion having
(b) a second portion extending at a right angle thereto and terminating in
(c) a third portion at a right angle to said second portion and parallel to said first portion.
5. The device of claim 4 in which said means pivotally mounting said arm is
(a) a first bearing mounted in said support means, and
(b) a second bearing mounted in said well housing.

* * * * *